Patented Nov. 11, 1924.

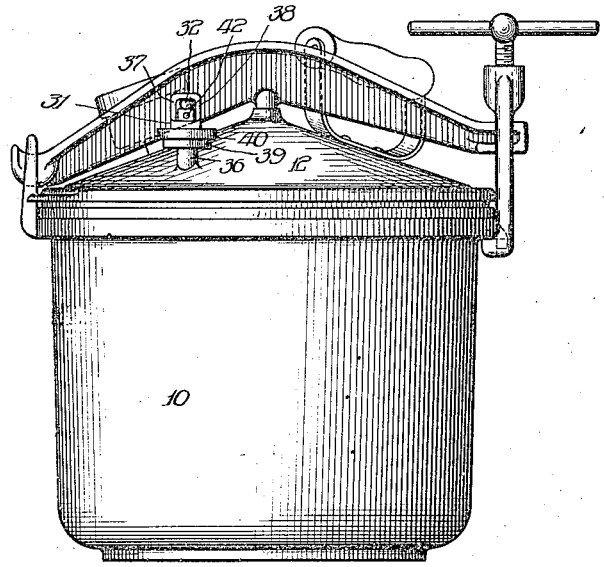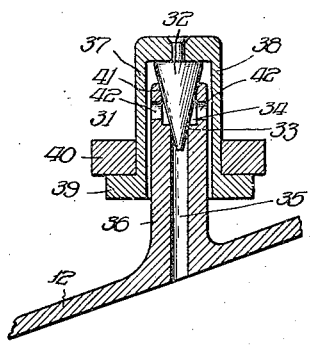

1,515,184

UNITED STATES PATENT OFFICE.

JACOB E. WAGGONER, OF CHICAGO, ILLINOIS.

PRESSURE-CONTROLLING MECHANISM FOR PRESSURE COOKERS.

Original application filed March 20, 1918, Serial No. 223,556. Divided and this application filed April 15, 1920. Serial No. 374,053.

*To all whom it may concern:*

Be it known that I, JACOB E. WAGGONER, a citizen of the United States, residing at Chicago, in the county of Cook and State of Illinois, have invented certain new and useful Improvements in Pressure-Controlling Mechanism for Pressure Cookers, of which the following is a specification.

This invention relates to the class of cooking vessels in which a self-generated pressure of steam is maintained for the purpose of expediting the cooking operation and effecting an economy in fuel consumed. More particularly the invention relates to pressure controlling mechanism forming a part of the cooker. This application is a division of my copending application, Serial No. 223,556, filed March 20, 1918.

The object of the invention is to provide a simple and efficient improved pressure controlling mechanism for pressure cookers adapted to meet all of the requirements for successful use.

This and other objects are accomplished by means of the arrangement disclosed on the accompanying sheet of drawings, in which—

Figure 1 is a side elevation of my improved cooker embodying the pressure control mechanism; and, Figure 2 is a sectional elevation of the pressure controlling mechanism.

The various novel features of the invention will be apparent from the following description and drawings and will be particularly pointed out in the appended claims.

Referring to the drawings, the body portion or receptacle 10 of the pressure cooker is shaped, in general, like an ordinary cooking kettle. Upon this body portion, which is preferably made of aluminum, may be placed the sealing cover 12, also of aluminum. The body and cover may be of any suitable design and clamped together in operative association in any suitable manner, as described in said parent application Serial No. 223,556.

In view of the fact that this invention relates primarily to the pressure controlling mechanism, attention is now called thereto. This pressure controlling mechanism includes a pressure controlling valve 31 comprising a movable conical valve member 32 which rests on the conical valve seat 33 formed in the enlarged upper portion 34 of the opening 35 in the tubular projection 36 on the cover 12. Suspended from the movable valve member 32 by means of the straps 37 and 38, and surrounding said tubular projection, is a weight in the form of an annular platform 39, upon which one or more annular weights 40 may be placed. The enlarged portion 34 has a conical guide surface 41 at its upper end to cooperate with the valve member 32. A plurality of vent openings 42, to permit the escape of steam when the valve member is moved off its seat, are provided in the tubular extension.

In operating the cooker a predetermined amount of water, together with the material to be cooked, canned or preserved, is placed within the body portion or receptacle and the cover is placed and clamped in position thereon. The movable member 32 of the valve 31 is placed in position and enough additional annular weights 40 added to determine the limit of pressure within the cooker. The proper amount of heat is then applied, either continuously or intermittently, to the cooker to generate and maintain any desired pressure. If the pressure becomes too great, the valve operates to relieve the pressure.

When the operation of cooking or canning is completed, the pressure is relieved by permitting the steam to escape through the valve. After the pressure has gone down, and not before, the cover may be released by removing the clamping means.

It is my intention to cover all modifications of the invention falling within the spirit and scope of the following claims.

I claim:

1. Pressure controlling mechanism for a pressure cooker having a cover and including a valve mounted on said cover and comprising a tubular member, the opening through which is enlarged at one of its ends to form a valve seat and a guide seat, a movable valve member resting upon said seats, and an annular platform surrounding said tubular member and suspended from said movable member, said platform adapted to receive one or more weights.

2. Pressure controlling mechanism for a pressure cooker having a cover and including a valve mounted on said cover and comprising a tubular member, the opening through which is enlarged at one of its ends to form valve and guide seats, a movable valve member resting upon said seats, and a weighted member suspended from said movable valve member.

3. Pressure controlling mechanism for a pressure cooker having a cover and including a valve mounted on said cover and comprising a tubular member, the opening through which is enlarged at one of its portions, said enlarged opening having a conical seat at its lower end and a guide seat thereabove, a movable conical valve member resting upon said seats and movable in said enlarged opening, and an annular platform surrounding said tubular member and suspended from said movable member, said platform adapted to receive one or more weights.

4. Pressure controlling mechanism for a pressure cooker having a cover and including a valve mounted on said cover and comprising a tubular member having a conical valve seat and guide surface, a valve member movable on said seat and engaging said guide surface, the movable valve member being normally out of contact with said tubular member between the conical valve seat and guide surface.

5. Pressure controlling mechanism for a pressure cooker having a cover and including a valve mounted on said cover and comprising a tubular member having a conical valve seat and guide surface, a valve member movable on said seat and engaging said guide surface, the movable valve member being normally out of contact with said tubular member between the conical valve seat and guide surface, and means for varying the pressure of said movable valve member on its seat.

6. Pressure controlling mechanism for a pressure cooker having a cover and including a valve mounted on said cover and comprising a tubular member, the opening through which is enlarged at one of its ends to form valve and guide seats, a movable valve member resting upon said seats, and a weighted member suspended from said movable valve member, said tubular member having an opening through which steam may escape and pass said weighted member when the valve is unseated.

7. Pressure valve mechanism including, in combination, a tubular member the opening through which is enlarged at one point to form guide means and a conical valve seat, a movable valve member normally resting on said seat and guided by said guide means, and a weighted member suspended from said valve outside of said tubular member.

8. Pressure valve mechanism including, in combination, a tubular member the opening through which is enlarged at the upper end to form a valve seat, there being lateral release openings in said tubular member intermediate the ends of said seat, a movable valve member normally resting on said valve seat normally to prevent the escape of fluid under pressure, and a weighted member suspended from said valve outside of said tubular member.

Signed at Chicago, Illinois, this 31st day of March, 1920.

JACOB E. WAGGONER.